June 2, 1970 S. A. WHITE 3,515,901

NAND/NOR CIRCUIT

Filed April 1, 1968

INVENTOR.
STANLEY A. WHITE

BY Howard A. Silber

ATTORNEY

United States Patent Office 3,515,901

Patented June 2, 1970

3,515,901

NAND/NOR CIRCUIT

Stanley A. White, Yorba Linda, Calif., assignor to North American Rockwell Corporation Filed Apr. 1, 1968, Ser. No. 717,539
Int. Cl. H03k *19/34, 19/36*
U.S. Cl. 307—215 6 Claims

ABSTRACT OF THE DISCLOSURE

A NAND/NOR circuit adapted for integrated circuit implementation. The inventive circuit comprises six field effect transistors and two diodes arranged to accept logical inputs A and B (each of which may be a binary 0 or 1) and to provide logical outputs A·B and A+B. The transistors, each of which has low source to drain resistance, are either completely OFF or saturated, thereby allowing operation at speeds significantly greater than obtainable in the prior art.

BACKGROUND OF THE INVENTION

Field of the invention

The present invention relates to a NAND/NOR circuit and more particularly to a high speed NAND/NOR circuit adapted for microelectric implementation.

Description of the prior art

Modern computer technology has placed an increasing burden on the digital circuit designer to produce circuits capable of being implemented microelectronically, and which will perform various logical functions at optimum speed. One such logical function, useful in performing parallel multiplication or sorting, is a NAND/NOR circuit. Such a circuit has two binary inputs, herein designated A and B, each of which may be either TRUE (binary 1) or FALSE (binary 0). The circuit provides two outputs, a NAND output designated by logical $\overline{A}\cdot\overline{B}$ and a NOR output designated by logical $\overline{A}+\overline{B}$.

A NAND/NOR circuit is particularly useful in parallel multiplication schemes wherein the binary digits in a column of numbers must be arranged to provide all the ones in low (or high) order positions. For example such a column may comprise the bits $X_1$, $X_2$ . . . each of which may be either one or zero. An arranging circuit accepts this column as an input and provide an output $X_a$, $X_b$ . . . wherein the number of binary ones is identical to the number of binary ones in the input, but wherein the location of the binary ones is arranged so that they are all in low (or high) order positions. Such an arranging circuit may be implemented using an interconnected plurality of NAND/NOR circuits, as described in detail hereinbelow.

In the prior art, NAND/NOR circuits configured for integrated circuit implementation have included two or more transistors connected in series between a voltage source and ground. Under certain logical conditions, all of the transistors may be ON, thereby connecting the voltage source to ground. To prevent the source from seeing a low impedance to ground (i.e., a short circuit)

at least one of the transistors is configured to have a relatively high forward (source to drain) resistance. Since the output of a NAND/NOR circuit typically is connected to the gate of a transistor in another logical circuit, the output will be located by the effective (gate) capacitance of the next stage. Thus when a prior art NAND or NOR output line is switched from ground to a positive voltage (i.e., from binary 0 to binary 1), the effective load capacitance must be charged through the relatively high source to drain resistance of one of the transistors of the circuit. This condition severely limits the speed at which such a prior art NAND/NOR circuit can operate.

This and other shortcomings of the prior art are overcome by the inventive NAND/NOR circuit adapted for microelectronic implementation. Logical operation of the inventive circuit completely prevents the voltage source from being connected at any time to ground, thereby permitting each of the transistors in the circuit to have very low source to drain resistance and to operate in a satuarted ON condition. As a result, the circuit output pulses have faster rise times, and hence the circuit has a higher operational speed, than obtainable in the prior art. The inventive circuit uses no resistors which, in MOS technology, would require considerable area on a microelectronic chip with concomitant sacrifice in circuit physical size.

SUMMARY OF THE INVENTION

The inventive NAND/NOR circuit comprises six field effect transistors (FET's) and two diodes interconnected to perform a logical function accepting inputs A and B (either of which may be binary 1 or 0) and providing NAND and NOR outputs $\overline{A}\cdot\overline{B}$ and $\overline{A}+\overline{B}$ respectively.

The inventive circuit comprises two P-channel transistors and one N-channel transistor connected with their sources and drains in series between a pulse voltage source and ground. The A input provides the gate voltage for the first P-channel tranistor, while the B input provides the gate signal for the other two transistors. Also connected with their sources and drains in series between the same voltage source and ground is an additional P-channel transistor and two additional N-channel transistors. The B input provides the gate signal for the P-channel transistor and one of the N-channel transistors, while the A input provides the gate signal for the other N-channel transistor. A diode interconnects the drains of the two P-channel transistors connected to the positive voltage source, while a second diode connects the sources of the two N-channel transistors connected to ground. The NAND and NOR outputs are taken respectively at the cathode of the first diode and the anode of the second diode.

The inventive NAND/NOR circuit readily may be implemented microelectrically using complimentry metal-oxide-semiconductor (CMOS) technology either on bulk silicon or sapphire. Several of the inventive NAND/NOR circuits may be combined to provide arranging or other logical functions.

Thus it is an object of the present invention to provide an improved NAND/NOR circuit.

It is another object of the present invention to provide a NAND/NOR circuit capable of being implemented microelectronically with CMOS–FET technology.

Another object of the present invention is to provide a NAND/NOR circuit in which all transistors operate either OFF or saturated.

A further object of the present invention is to provide a NAND/NOR circuit utilizing transistors each having a low source to drain resistance.

Yet a further object of the present invention is to provide a NAND/NOR circuit of very fast operational speed.

Still a further object of the present invention is to provide a NAND/NOR circuit having very low standby power.

BRIEF DESCRIPTION OF THE DRAWINGS

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

FIG. 1 is a logic diagram of a NAND/NOR circuit useful for data sorting applications and the like.

FIG. 2 is an electrical schematic diagram of a NAND/NOR circuit in accordance with the prior art.

FIG. 3 is an electrical schematic diagram of the inventive NAND/NOR circuit.

DESCRIPTION OF THE PREFERRED EMBODIMENT

Figures 1, 2, 3:
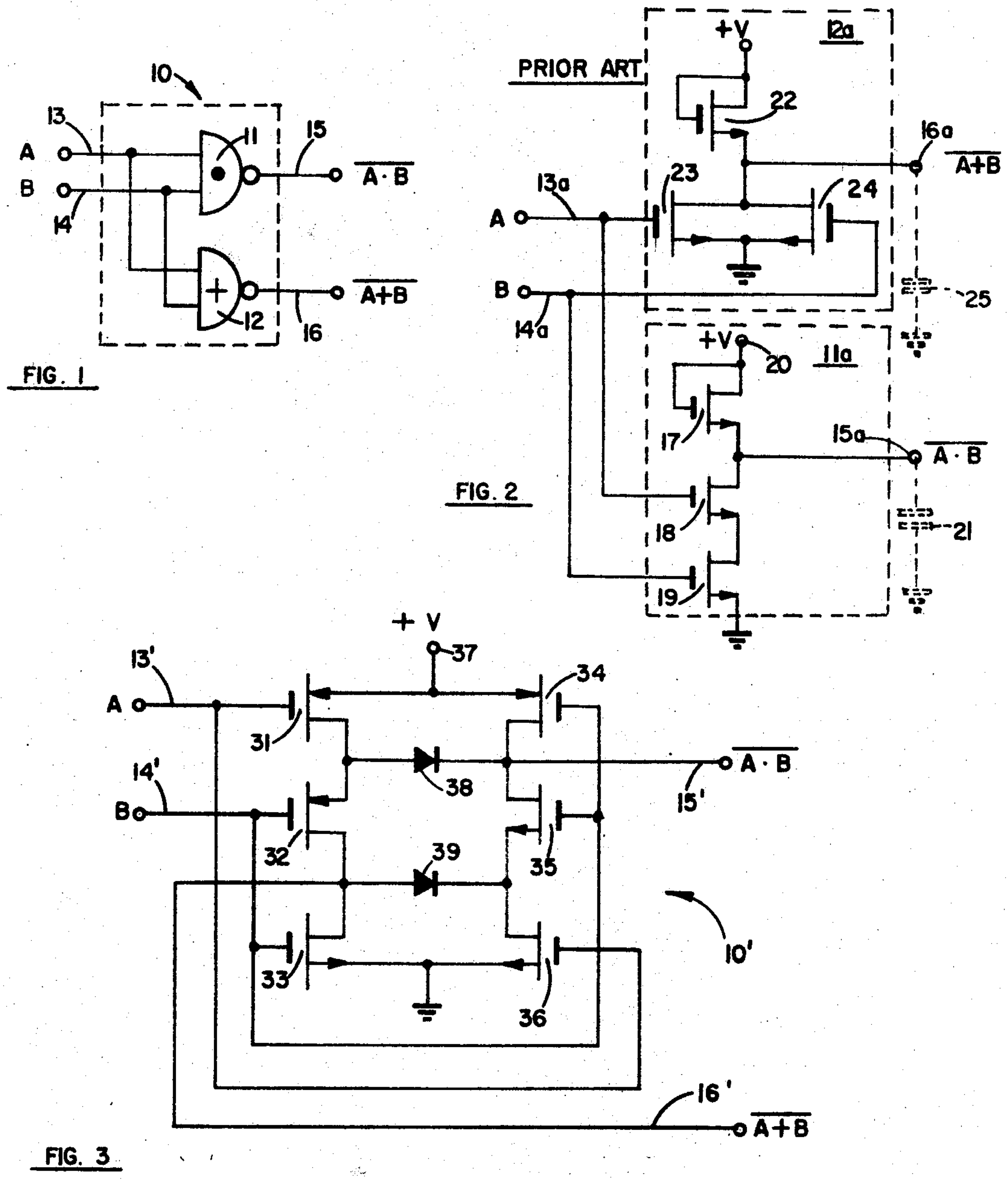

Referring now to FIG. 1, there is shown a logic diagram of a circuit 10 comprising a NAND gate 11 and a NOR gate 12. NAND/NOR circuit 10 is useful for data sorting operations, hence may be referred to as a "sorter" cell. Sorter cell 10 has two inputs 13 and 14, herein designated A and B, each of which may be logically TRUE (i.e., binary 1) or FALSE (i.e., binary 0). Sorter cell 10 includes a NAND output 15 represented by the logical symbol $\overline{A \cdot B}$ and a NOR output 16 symbolically represented by $\overline{A+B}$. As will be appreciated by one skilled in the digital logic art, the outputs $\overline{A \cdot B}$ and $\overline{A+B}$ are related to inputs A and B as indicated in the following truth table.

TABLE I

| A | B | $\overline{A.B}$ | $\overline{A+B}$ |
|---|---|---|---|
| 0 | 0 | 1 | 1 |
| 0 | 1 | 1 | 0 |
| 1 | 0 | 1 | 0 |
| 1 | 1 | 0 | 0 |

The typical manner in which sorter cell 10 has been implemented in the prior art is shown by the electrical schematic diagram of FIG. 2. As illustrated therein, NAND gate **11*a* comprises field effect transistors (FET's) 17, 18 and 19 connected as shown between a source 20 of positive voltage +V and ground. Inputs A (from terminal 13*a*) and B (from terminal 14*a*) are applied respectively to the gates of transistors 18 and 19, while the gate of transistor 17 is tied to the source of the same transistor and to voltage source 20. The NAND output 15*a* is taken from the common junction between the drain of transistor 17 and the source of transistor 18. Typically, NAND output 15*a* may be connected to the gate of the input transistor in the next successive logic circuit. Thus there will appear an effective (gate) capacitance 21 (illustrated in phantom in FIG. 2) between NAND output terminal 15*a*** and ground.

Still referring to FIG. 2, a typical NOR circuit **12*a* of the prior art includes transistors 22, 23, and 24. The gate of transistor 22 is tied to the source of the same transistor and to a voltage source +V which may be the same as source 20. The drain of transistor 22 is connected to the source of transistors 23 and 24, and also provides the NOR output at terminal 16*a*. The drains of transistors 23 and 24 are connected to ground, while the gates of transistors 23 and 24 respectively are connected to A and B input terminals 13*a* and 14*a*. Typically, NOR output 16*a* may be connected to the gate of the input transistor in the next successive logic circuit. Thus there may appear an effective (gate) capacitance 25 (illustrated in phantom in FIG. 2) between NOR output terminal 16*a*** and ground.

In operation, the prior art NAND/NOR circuit of FIG. 2 accepts TRUE or FALSE inputs A and B at input terminals **13*a* and 14*a*. Should inputs A and B both be binary 1, transistors 18 and 19 in NAND circuit 11*a* each will be ON. Thus, output terminal 15*a* will be clamped to ground (via the source and drain of transistors 18 and 19), indicating a logical zero output. Since transistor 17 also will conduct as a result of the plus voltage applied to its gate, a voltage path appears from terminal 20 to ground via transistors 17, 18 and 19. To prevent shorting of the +V supply in this condition (A and B both TRUE), transistor 17 is fabricated to exhibit substantial source to drain resistance. Thus, even when transistors 18 and 19 saturate, thereby clamping output terminal 15*a* to ground, the +V source 20 sees a high impedance, provided by the forward resistance of transistor 17**.

When either of inputs A or B to the prior art NAND/NOR circuit of FIG. 2 goes FALSE, the corresponding one of transistors 18 and 19 goes OFF. Since transistor 17 is still ON, the potential at output terminal **15*a* starts to rise, charging the effective load capacitance 21 toward +V. However, since capacitor 21 is charged through the high forward (source to drain) resistance of transistor 17, the rise time of the pulse appearing at NAND output 15*a* will be limited, thereby concomitantly limiting the speed at which prior art NAND circuit 11*a*** can operate.

A similar situation is encountered with prior art NOR circuit **12*a*. As shown in FIG. 2, A and B inputs 13*a* and 14*a* are connected respectively to the gates of transistors 23 and 24, while NOR output 16*a* is taken from the common source connection of transistors 23 and 24. Thus when the inputs A and B both are binary 1, transistors 23 and 24 each will be turned ON, and output 16*a* will be clamped to ground. Since the gate of transistor 22 is connected to the positive voltage source, transistor 22 will be conducting. To prevent the +V source from being shorted to ground in this condition (A and B both TRUE) the geometry of transistor 22 is appropriately configured to provide substantial source to drain resistance. When both A and B inputs turn FALSE, transistors 23 and 24 go OFF, and an output pulse appears at output terminal 16*a*. Effective load capacitance 25 (typically the gate capacitance of the next stage) then is charged through the high forward (source to drain) resistance of transistor 22. This limits the rise time possible for the output pulse of prior art NOR circuit 12*a*** (see FIG. 2), and hence limits its speed of operation.

In accordance with the present invention, there is shown in FIG. 3 a schematic diagram of a novel NAND/NOR circuit useful for performing the function of sorter cell 10, and capable of operating at much higher speed than the prior art NAND/NOR circuit of FIG. 2.

Referring specificially to FIG. 3, inventive NAND/NOR circuit 10′ comprises six transistors 31–36. In the embodiment shown, field effect transistors 32, 32, and 34 are of the P-channel variety, while field effect transistors 33, 35, and 36 are of the N-channel type. A positive voltage source 37 is connected directly to the source of each of transistors 31 and 34. The drain of transistor 31 is connected to the souce of transistor 35. Similarly, the drain of transistor 32 is connected to the source of transistor 33, while the drain of transistor 35 is connected to the source of transistor 36. The drain of each of transistors 33 and 36 is connected to ground. A first diode 38 is connected between the drain of transistor 31 and the drain of transistor 34. A second diode 39 is connected between the drain of transistor 32 and the drain of transistor 35.

The A input 13' (see FIG. 3) is connected to the gate of transistor 31 and to the gate of transistor 36. The B input 14' is connected to the gate of each of transistors 32, 33, 34 and 35. The NAND output 15' is taken from the junction of the drain of transistor 34, the source of transistor 35, and the cathode of diode 38. The NOR output 16' is taken from the junction of the drain of transistor 32, the source of transistor 33, and the cathode of diode 39.

The operational truth table of inventive NAND/NOR circuit 10' illustrated in FIG. 3 is given below as Table II.

voltage +V will appear at NAND output terminal 15', the voltage being supplied from source 37 via the source and drain of transistors 34. With the same A and B inputs (1 and 0, respectively), NOR output terminal 16' will be clamped to ground potential since transistor 36 will be ON. Note that since transistor 35 is OFF, there is no current path from voltage source 37 to ground, even though transistors 34 and 36 both are ON.

Should inputs A and B to inventive NAND/NOR circuit 10' of FIG. 3 both be binary 1, P-channel transistor 31 will be biased OFF by the positive voltage appearing at terminal A, while P-channel transistors 32 and 34 each will be biased OFF by the positive gate voltage supplied at

TABLE II

| Inputs | | Transistors | | | | | | Outputs | |
|---|---|---|---|---|---|---|---|---|---|
| A | B | 31 | 32 | 33 | 34 | 35 | 36 | $\overline{A \cdot B}$ | $\overline{A+B}$ |
| 0 | 0 | ON | ON | OFF | ON | OFF | OFF | +V | +V |
| 0 | 1 | ON | OFF | ON | OFF | ON | OFF | +V | 0 |
| 1 | 0 | OFF | ON | OFF | ON | OFF | ON | +V | 0 |
| 1 | 1 | OFF | OFF | ON | OFF | ON | ON | 0 | 0 |

Note that the inputs A and B and the outputs $\overline{A \cdot B}$ and $\overline{A+B}$ each correspond to those set forth in the NAND/NOR truth table included hereinabove as Table I. Table II also lists the operational states of the transistors 31 through 36 used in the inventive NAND/NOR circuit 10'. In Table II, the designation "ON" means that the corresponding transistor is conducting, while the designation "OFF" indicates that the corresponding transistor is not conducting.

It will be appreciated from consideration of the diagram of FIG. 3 and of Table II, that when inputs A and B both are O, P-channel transistors 31, 32 and 34 are conducting, and N-channel transistors 33, 35 and 36 are OFF. In this instance, a current path is provided from the positive voltage terminal 37 through the source and drain of transistor 34 to NAND output terminal 15'. A parallel current path also is provided from voltage terminal 37 via the source and drain of transistor 31, through diode 38, to output terminal 15'. Since transistors 33, 35 and 36 are OFF, neither side of diode 38 is clamped to ground. Thus, the $\overline{A \cdot B}$ output 15' is +V. Since transistor 32 also is ON, a current path is provided from voltage source 37 through the source and drain of transistor 31 and the source and drain of transistor 32 to NOR output terminal 16'. Since transistor 33 is OFF, output terminal 16' is not tied to ground.

When input is 0 and input B is 1, P-channel transistor 31 is ON, since its gate voltage is zero. P-channel transistors 32 and 34 will be turned OFF by the +V signal (since B is TRUE) applied to the gate of these transistors. N-channel transistors 33 and 35 will be ON, since they receive a gate voltage +V, while P-channel transistor 36 will be OFF, since its gate voltage is zero. In this instance, an output +V will appear at NAND output terminal 15', the votlage path being from voltage source 37, through the source and drain of transistor 31, and through diode 38. Since transistors 32 and 36 both are OFF, the terminal 15' is isolated from ground. With A and B inputs 0 and 1 respectively, NOR output terminal 16' will be zero. This is so since transistor 33 is ON, thereby clamping the source of transistor 33, and hence output terminal 16', to ground. Note that since transistor 32 is OFF, there is no open path from +V terminal 37 to ground, even through transistors 31 and 33 are ON.

Still referring to FIG. 3, inputs A and B respectively are 1 and 0, then P-channel transistor 31 will be OFF due to the +V voltage at the gate of transistor 31. However, P-channel transistors 32 and 34 wil be conducting since the gate voltage of transistors 32 and 34 is zero, B being FALSE. Likewise, N-channel transistors 33 and 35 each will be OFF, since the gates of transistors 33 and 35 will be at zero potential, and N-channel transistor 36 will be ON, since its gate potential, supplied by the A input, will be positive. Under these conditions, a positive output B terminal 14'. Similarly, N-channel transistors 33 and 35 will be turned ON, due to the positive voltage supplied by B terminal 14' while N-channel transistor 36 wiil be ON due to the positive voltage supplied by the input to A terminal 13'. In this instance, NAND output terminal 15' will be clamped to ground, the conduction path being via transistors 35 and 36. Similarly, NOR output terminal 16' will be clamped to ground by conduction of transistor 33. Again there is no direct conduction path between voltage terminal 37 and ground, even though transistor 35 and 36 are ON, since transistors 31 and 34 are OFF.

From the foregoing discussion, it will be appreciated that inventive NAND/NOR circuit 10' illustrated in FIG. 3 performs the functions of the sorter cell shown in logic diagram form in FIG. 1. Since circuit 10' never provides a current path from +V terminal 37 to ground, there is no need to provide any of transistors 31–36 with substantial forward resistance. Thus, each of transistors 31–36 may be fabricated so as to exhibit very low source to drain resistance. For this reason, when either of output terminals 15' or 16' goes positive, any effective load capacitance is charged very rapidly from a low impedance source. This permits the inventive NAND/NOR circuit 10' to operate at much higher speeds than possible with prior art NAND/NOR circuits such as that illustrated in FIG. 2.

The inventive circuit of FIG. 3 readily may be implemented microelectronically, the circuit employing only transistors and diodes. Conventional metal-oxide-semiconductor (MOS) techniques may be employed to fabricate the inventive NAND/NOR circuit. The circuit also is amenable to fabrication in silicon-on-sapphire.

Figure 4:
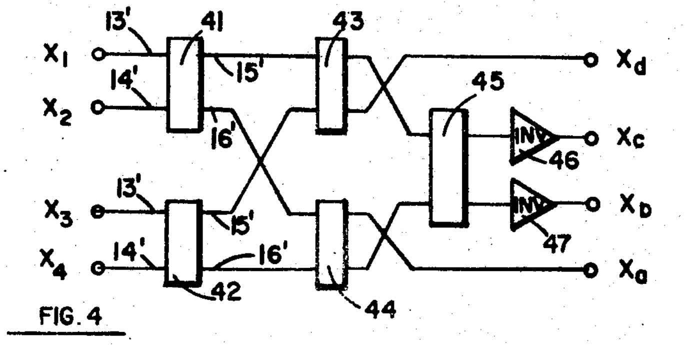
FIG. 4 is an electrical block diagram of a circuit useful for rearranging the order of a series of bits, the circuit employing a plurality of NAND/NOR circuits such as that shown in FIG. 3.

Shown in FIG. 4 is a data arranging circuit utilizing a plurality of NAND/NOR circuits ("sorter cells") such as that illustrated in FIG. 3. Referring to FIG. 4, the arranging circuit illustrated comprises five sorter cells 41, 42, 43, 44 and 45, each represented logically by the diagram of FIG. 1, and each implemented by the inventive NAND/NOR circuit shown in FIG. 3. The A and B inputs for each of sorter cells 41–45 (see FIG. 4) are designated 13' and 14' respectively, while the NAND and NOR outputs of each of sorter cells 41–45 are designated 15' and 16' respectively. The arranging circuit of FIG. 4 also employs a pair of conventional inverter circuits 46 and 47 used to invert respectively the NAND and NOR outputs of sorter cell 45.

The arranging circuit of FIG. 4 accepts a parallel byte having bits $X_1$, $X_2$, $X_3$ and $X_4$. The circuit supplies as an output parallel byte having bits $X_a$, $X_b$, $X_c$ and $X_d$. Regardless of the arrangement of binary ones and zeros in the input byte, the output will be arranged so that the ones are in the low order positions only. For example, if the input byte $X_1, X_2, X_3, X_4$=0100, the output byte $X_a, X_b, X_c, X_d$ will be 0001. Various (nonexhaustive) examples of inputs and outputs from the arranging circuit of FIG. 4 are listed in Table III.

TABLE III

| INPUT $X_1, X_2, X_3, X_4$ | OUTPUT $X_a, X_b, X_c, X_d$ |
|---|---|
| 0000 | 0000 |
| 0001 | 0001 |
| 1000 | 0001 |
| 0100 | 0001 |
| 0101 | 0011 |
| 1010 | 0011 |
| 0111 | 0111 |
| 1011 | 0111 |
| 1110 | 0111 |
| 1111 | 1111 |

An arranging circuit such as that illustrated in FIG. 4 is useful in computer application to achieve parallel multiplication. In certain such schemes, it is important to know how many binary ones or zeros there are in a particular column of numbers. If each of the columns provides one input $X_1$, $X_2$ . . . the binary bits in the input byte will be arranged by the circuit of FIG. 4, and the highest order output position $X_a$, $X_b$ . . . at which a binary one appears will indicate the number of binary ones in the input byte.

It will be appreciated by one skilled in the digital circuitry art that various modifications may be made to the inventive NAND/NOR circuit of FIG. 3 without departing from the spirit of the present invention. For example, while circuit 10' is shown as working with a potential of +V and ground, this is not required. The circuit also will work with a negative voltage supply, by tieing terminal 37 to ground, and by attaching the common drain connection of transistors 33 and 36 to the −V source, rather than to ground as shown in FIG. 3. Alternatively, while N and P channel transistors are shown, the channel of each transistor may be reversed, and opposite polarity voltages employed. An alternative input scheme also may be employed wherein the A input is connected to the gates of transistors 31, 33, and 35, and the B input is connected to the gates of transistors 32, 34 and 36.

Although the invention has been described and illustrated in detail, it is to be understood that the same is by way of illustration and example only, and is not to be taken by way of limitation; the spirit and scope of this invention being limited only by the terms of the appended claims.

I claim:

1. A NAND/NOR circuit adapted to receive binary inputs A and B, to provide a NAND output $\overline{A}\cdot\overline{B}$ and a NOR output $\overline{A}+\overline{B}$, and to operate from a voltage source said circuit comprising, in combination:

first, second and third P-channel transistors, first, second and third N-channel transistors, and first and second diodes, and wherein;

the source of said first P-channel transistor and the source of said second P-channel transistor each is connected to said voltage source, the drain of said first P-channel transistor is connected to the source of said third P-channel transistor and to the anode of said first diode, the drain of said third-P-channel transistor is connected to the source of said first N-channel transistor and to the anode of said second diode and to the said NOR output terminal, the drain of said first N-channel transistor and the drain of said second N-channel transistor each is connected to ground, the drain of said second-P-channel transistor is connected to the source of said third N-channel transistor and to the cathode of said first diode and to the said NAND output terminal, the drain of said third N-channel transistor is connected to the source of said second N-channel transistor and to the cathode of said second diode, said A input being connected to the gate of said first P-channel transistor and to the gate of said second N-channel transistor, and said B input being connected to to the gates of each of said second and third P-channel transistors and to the gates of each of said first and third N-channel transistors.

2. The circuit defined in claim 1 wherein each of said transistors has low source to drain resistance.

3. A NAND/NOR circuit having binary inputs A and B, a NAND output $\overline{A}\cdot\overline{B}$, and a NOR output $\overline{A}+\overline{B}$, said circuit being adapted to operate from a voltage source having first and second voltage terminals, said circuit comprising, in combination:

first, second, third, fourth, fifth, and sixth transistors, and first and second diodes, and wherein;

the source of said first transistor and the source of said second transistor each is connected to said first voltage terminal, the drain of said first transistor is connected to the source of said third transistor and to one terminal of said first diode, the drain of said second transistor is connected to the source of said fourth transistor and to the other terminal of said first diode and to said NAND output, the drain of said third transistor is connected to the source of said fifth transistor and to one terminal of said second diode and to said NOR output, the drain of said fourth transistor is connected to the source of said sixth transistor and to the other terminal of said diode, and the drain of said fifth transistor is connected to the drain of said sixth transistor and to said second voltage terminal.

4. The circuit defined in claim 3 wherein said A input is connected to the gate of each of said first and sixth transistors, and wherein said B input is connected to the gate of each of said second, third, fourth and fifth transistors.

5. The circuit defined in claim 3 wherein said A input is connected to the gate of each of said first, fourth and fifth transistors, and wherein said B input is connected to the gate of each of said second, third and sixth transistors.

6. The circuit defined in claim 3 wherein each of said transistors has low source to drain resistance.

References Cited

UNITED STATES PATENTS 3,439,185 4/1969 Gibson ------------- 307—205

OTHER REFERENCES

IBM Technical Disclosure, vol. 9, No. 6, November 1966, pp. 698, 699, titled MOS Transistor Current Switch, by R. L. Moore.

STANLEY T. KRAWCZEWICZ, Primary Examiner

U.S. Cl. X.R.

307—205, 251, 304, 313